United States Patent [19]

Itoh et al.

[11] Patent Number: 5,256,614

[45] Date of Patent: Oct. 26, 1993

[54] CATALYST FOR PURIFICATION OF EXHAUST GAS

[75] Inventors: Takashi Itoh; Hiroyuki Yamaguchi, both of Ichikawa, Japan

[73] Assignee: N. E. Chemcat Corporation, Tokyo, Japan

[21] Appl. No.: 946,859

[22] Filed: Sep. 18, 1992

[30] Foreign Application Priority Data

Apr. 27, 1992 [JP] Japan ............................. 4-134243

[51] Int. Cl.$^5$ ............................................. B01J 29/06
[52] U.S. Cl. ................................................... 502/61
[58] Field of Search ................. 502/61; 423/213.2, 212

[56] References Cited

U.S. PATENT DOCUMENTS 5,085,840 2/1992 Held et al. ........................ 423/212
5,149,511 9/1992 Montreuil et al. ................. 423/212

FOREIGN PATENT DOCUMENTS 0507656 10/1992 European Pat. Off. ............... 502/61

Primary Examiner—Carl F. Dees
Attorney, Agent, or Firm—Wenderoth, Lind & Ponack

[57] ABSTRACT

A catalyst for purification of exhaust gases containing nitrogen oxides in the co-existence of oxygen in excess of stoichiometric amount, which catalyst comprises (a) a carrier consisting of a crystalline metallosilicate whose anhydrous state is represented by the following chemical formula $$[(x+y)/n]R\ (M_xAl_ySi_z)O_2$$

wherein R is at least one cation having a valence n; x, y and z are, respectively, mole fractions of different metal elements M, Al and Si present as a tetrahedral oxide in the skeletal structure; M is at least one metal selected from the group consisting of Ga, Fe, Y and rare earth elements; $X+Y+z=1,000$, $x \geq 0$, $y > 0$ and $0.990 \geq z \geq 0.882$, and (b) a co-precipitated compound oxide of copper and gallium, supported on said carrier in a dispersed state.

The present invention provides a catalyst for NOx abatement which can be used for treatment of exhaust gases containing nitrogen oxides in the co-existence of oxygen in excess of stoichiometric amount and which has high NOx abatement activity and very high durability over a wide temperature range.

2 Claims, 1 Drawing Sheet

CATALYST FOR PURIFICATION OF EXHAUST GAS

BACKGROUND OF THE INVENTION

1. Field of the Invention

The present invention relates to a catalyst suitably used for purification of exhaust gases, preferably nitrogen oxides emitted from internal combustion engines, etc.

2. Description of the Prior Art

Removal of air pollutants is an important task in view of the protection of global environment. Removal of, in particular, nitrogen oxides which are said to be a cause for photochemical smog and acid rain, is a task requiring an urgent solution.

Selective catalytic reduction using ammonia has hitherto been used for exhaust gases emitted from large-sized stationary sources such as thermal power stations and the like, and a considerable result has been obtained for purification of said exhaust gases.

Meanwhile, for exhaust gases emitted from on-site cogeneration engines or gasoline engines of passenger cars, trucks, etc., there have been used three-way catalysts (TWCs) capable of simultaneously removing carbon monoxide (CO), hydrocarbons (HCs) and nitrogen oxides (NOx) with the air-fuel ratio being controlled to about a stoichiometric level (A/F=14.6).

In recent years, the control of carbon dioxide ($CO_2$) emission has become necessary for the protection of global warming, and the practical application of lean-burn engines has been desired. Three-way catalysts, however, are not effective for said lean-burn engines.

Diesel engines, which are basically a lean-burn engine, must use a means such as exhaust gas recirculation (EGR), delayed fuel injection timing or the like in order to control the NOx in exhaust gas, and the presence of a certain amount of suspended particulates in exhaust gas has been allowed. In the future, however, stricter regulation will be imposed on both the particulates and NOx emitted from diesel engines. Incidentally, in the exhaust gases from diesel engines, the amounts of particulates and NOx are in a trade-off relationship, and it is considered that the amount of particulates can be reduced significantly in the NOx can be efficiently removed with a catalyst.

Engines employing lean burn system, such as lean-burn gasoline engines, diesel engines and the like are hereinafter referred to generically as lean-burn engines.

In recent years, various catalyst systems have been proposed for the purpose of abatement of NOx in exhaust gases emitted from lean-burn engines, containing oxygen in excess of stoichiometric amount. For example, a copper ion-exchanged zeolite was disclosed in U.S. Pat. No. 4,297,328 and Japanese Patent Application Kokai (Laid-Open) No. 100919/1988; a noble metal (e.g. platinum, palladium, rhodium)-ion-exchanged zeolite was disclosed in Japanese Patent Application Kokai (Laid-Open) No. 135541/1989; a copper ion-exchanged metallosilicate was disclosed in Japanese Patent Application Kokai (Laid-Open) No. 127628/1991; and a copper and VIII group element-on-metallosilicate catalyst was disclosed in Japanese Patent Application Kokai (Laid-Open) No. 229620/1991.

These conventional zeolite or metallosilicate type catalyst [hereinafter referred to generically as metallosilicate type catalysts], however, have detrimental drawbacks in, for example, that the temperature range effective for NOx abatement is limited and that the activity deterioration is remarkable in high-temperature exhaust gases containing steam. Hence, their performances are not yet at a level allowing practical application.

SUMMARY OF THE INVENTION

The present invention has been made in order to solve the above-mentioned problems of conventional catalysts, and has an object of providing a catalyst for NOx abatement, having high activity, excellent heat resistance and excellent durability and used for exhaust gases containing oxygen in excess of stoichiometric amount, emitted from lean-burn engines.

The above object can be achieved by the present invention, i.e. a catalyst for purification of exhaust gases containing nitrogen oxides in the co-existence of oxygen in excess of stoichiometric amount, which catalyst comprises (a) a carrier consisting of a crystalline metallosilicate whose anhydrous state is represented by the following chemical formula

wherein R is at least one cation having a valence n; x, y and z are, respectively, mole fractions of different metal elements M, Al and Si present as a tetrahedral oxide in the skeletal structure; M is at least one metal selected from the group consisting of Ga, Fe, Y and rare earth elements; $X+Y+x=1,000$, $x \geq 0$, $y>0$ and $0.990 \geq z \geq 0.882$, and (b) a co-precipitated compound oxide of copper and gallium, supported on said carrier in a dispersed state.

DETAILED DESCRIPTION OF THE PREFERRED EMBODIMENTS

Figure 1:
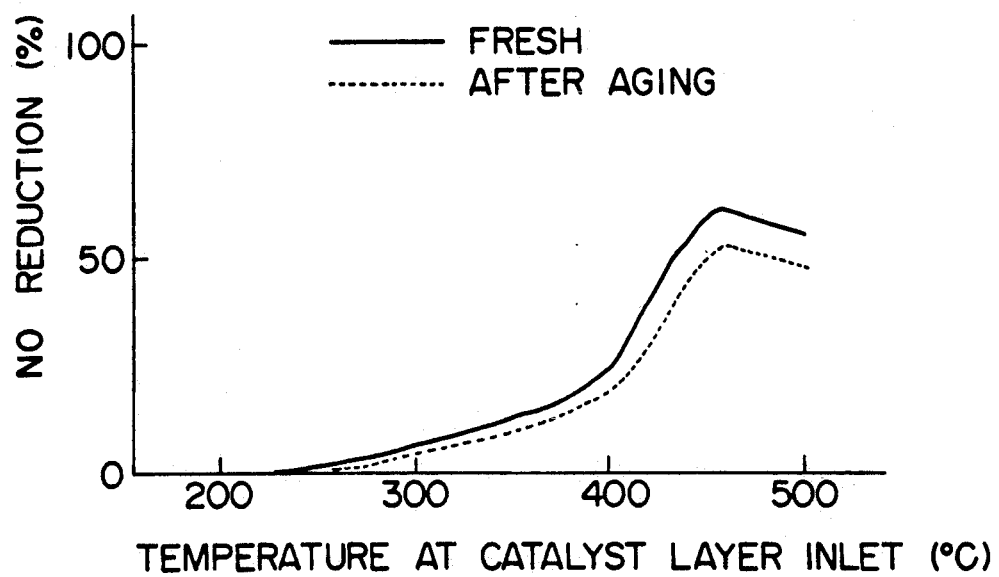
FIG. 1 shows the NO abatement activities measured in mode c, of the catalyst (1) (produced in Example 1) in a fresh state and after aging.

The catalyst for exhaust gas purification according to the present invention comprises (a) a carrier consisting of a crystalline metallosilicate whose anhydrous state is represented by the following chemical formula

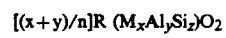

wherein R is at least one cation having a valence n; x, y and z are, respectively, mole fractions of different metal elements M, Al and Si present as a tetrahedral oxide in the skeletal structure; M is at least one metal selected from the group consisting of Ga, Fe, Y and rare earth elements; $X+Y+z=1,000$, $x \geq 0$, $y>0$ and $0.990 \geq z \geq 0.882$, and (b) a co-precipitated compound oxide of copper and gallium, supported on said carrier in a dispersed state.

Copper-on-aluminogallosilicate catalysts are known (Japanese Patent Application No. 157894/1991) but their durabilities have not been sufficient. Copper and gallium oxide-on-aluminosilicate catalysts (ibid) are also known but their activities have been low.

Recently, the present inventors reported that co-precipitated copper and tin compound oxide-on-metallosilicate catalysts show improved high-temperature durability in the co-existence of steam (Japanese Patent Application No. 173250/1991).

The present inventors continued study in order to develop a catalyst system having even higher high-temperature durability and, as a result, found that catalysts comprising (a) a metallosilicate carrier and (b) a co-precipitated copper and gallium compound oxide supported on said carrier in a dispersed state (It should be remarked that gallium has hitherto been considered only as an element for forming the skelton of a metallosilicate carrier), exhibit significantly improved durability, as compared with conventional copper-on-metallosilicate catalysts or copper and transition metal element-on-metallosilicate catalysts. The finding has led to the completion of the present invention.

Zeolite is a crystalline aluminosilicate corresponding to a case x=0 of anhydrous metallosilicates represented by the following general formula $$[(x+y)/n]R \, (M_xAl_ySi_z)O_2$$

wherein R is at least one cation having a valence n; x, y and z are, respectively, mole fractions of different metals M, Al and Si present in the skeletal structure as a tetrahedral oxide; and $x+y+z=1$. Zeolite can have a network structure, depending upon the form in which the $SiO_4$ and $AlO_4$ tetrahedrons constituting the skelton are bounded to each other three-dimensionally. Owing to this network structure, zeolite has porosity and exhibits a molecular sieve effect. Moreover, since part of $Si^{4+}$ in the skeletal structure is substituted with $Al^{3+}$, zeolite has shortage of positive charges and, for compensating the shortage, requires R, for example, cations such as $Na^+$, $K^+$ and the like; consequently, zeolite has ion exchange ability.

On the other hand, the case $x\neq 0$ in the above general formula for metallosilicates, that is, the compound obtained by substituting part of the skeletal atom Al of zeolite to isomorphous substitution with a different metal element M, is a metallosilicate. It is called differently depending upon the degree of substitution with M; it is called metallosilicate (of narrow sense) when the substitution degree is almost 100%, or metalloaluminosilicate when the substitution degree is larger than 0% but smaller than 100%.

Production of pure (100%) metallosilicate is virtually impossible unless the purification of raw materials is conducted at the sacrifice of the cost. It is because commercially available raw material silicon sources for gel hydrothermal synthesis contain Al as an impurity in an amount of about 500:1 in terms of Si/Al atomic ratio and this Al remains in a product. Consequently, even metallosilicates other than aluminosilicate actually contain a small amount of Al, and they are regarded as metalloaluminosilicates. In the present specification, aluminosilicates and metalloaluminosilicates are both called metallosilicates (of broad sense).

In the present invention, each metallosilicate is referred to as a carrier for convenience's sake, but has a function more than a mere substrate for catalytically active component and is an essential constituent of NOx abatement catalyst.

In the crystalline metallosilicate which is a carrier and also an essential constituent in the catalyst of the present invention, the type of cation R is not particularly restricted and R may be cations of hydrogen, alkali metals, alkaline earth metals and transition metals. Proton ($H^+$) is particularly preferable.

In the metallosilicate which is an effective carrier in the catalyst of the present invention, M can be various metal elements but is preferably selected from Ga, Fe, Y and rare earth elements such as La, Ce, Nd and the like.

The ratio of M, Al and Si each constituting the skeleton of the crystalline metallosilicate of the present catalyst is preferably as follows in terms of molar ratio of respective metal oxides:

$$15 \leq [(SiO_2/(M_2O_3+Al_2O_3)] = [2z/(x+y)] \leq 200$$

that is, $$0.882 \leq z \leq 0.990$$

When the atomic ratio of Si and (M+Al) is smaller than 7.5, the atom number of Al and/or M in crystal structure is large and the metallosilicate has high hydrophilicity and low heat resistance even though a co-precipitated copper and gallium compound oxide is supported thereon. Meanwhile when the atomic ratio of Si and (M+Al) is larger than 100, the catalyst has low acidity and consequently low activity for NOx abatement.

The crystal structure of the crystalline metallosilicate which is a carrier in the present invention, has no particular restriction and can be any of MFI type, MEL type, MOR type, FER type, TON type, etc. A MFI type or a MEL type is particularly preferable.

Incidentally, in the present specification, the nomenclature of the crystal structure of metallosilicate abides by the IUPAC recommendation on nomenclature of zeolites, given in "Chemical Nomenclature, and Formulation of Compositions, of Synthetic and Natural Zeolites", IUPAC yellow blooklet, 1978.

Synthesis of the crystalline metallosilicate has no particular restriction and can be conducted by known processes for synthesizing various metallosilicates. The crystalline metallosilicate is produced, for example, by a gel hydrothermal synthesis process, that is, by mixing a silica source and an alumina source and/or a source of metal (M) oxide to prepare a homogeneous mixed gel, and then keeping the gel for a given period of time (e.g. 10 hours to several hundreds of hours) under a hydrothermal synthesis condition of 100°–300° C. in the presence or absence of a template agent such as tetrapropylammonium compound, ethylenediamine, pyrrolidine or the like. By changing, in the above process, the ratio of raw materials fed and the synthesis conditions, there can be produced metallosilicates of different structures and different Si/Al ratios and/or Si/M ratios, different Si/(M+Al) ratios and different M/Al ratios.

Generally in metallosilicates, the higher the crystallinity (i.e. the smaller the lattice defect), the higher is the heat resistance.

However, the particle sizes of crystal of the metallosilicate used in the present catalyst must not be too large in order for the metallosilicate to be able to support the co-precipitated copper and gallium compound oxide (catalytically active component) in a highly dispersed state.

The metallosilicate as a carrier should be produced so that the catalyst produced therewith has the highest activity and durability.

With respect to the zeolite type catalysts for hydrocarbon conversion, used in the field of petroleum refining, it has been known that zeolites having the same crystal form but different Al:Si ratios have delicately different pore diameters and/or different acidities and consequently show different catalytic activities.

In NOx abatement from exhaust gases of leanburn engines, the hydrocarbons, etc. present in exhaust gas and functioning as a reducing agent for selective reduction of NOx must first be adsorbed on and activated by the metallosilicate carrier of the catalyst used. Therefore, it is desirable that the network structure and M:Al:Si ratio of the metallosilicate be optimized depending upon the type(s) of main hydrocarbon component(s) present in exhaust gas.

The crystalline metallosilicates obtained by hydrothermal synthesis, generally contain, at the ion-exchange sites, alkali metal cations (e.g. $Na^+$, $K^+$) and/or organic base cations (e.g. $NH_4^+$, tetrapropylammonium cation).

They may be used per se, but are preferably converted first to a H type by calcination decomposition at 400°–600° C. for decomposition.

The H type and/or alkali metal type crystalline metallosilicates obtained by hydrothermal synthesis show substantially no activity for NOx reduction by themselves under the actual condition for exhaust gas treatment, of at least 10,000/hr in gas space velocity.

It was found, however, that a catalyst obtained by allowing the crystalline metallosilicate to support a co-precipitated copper and gallium compound oxide shows high NOx abatement activity and excellent durability over a wide temperature range of 200°–800° C.

The co-precipitated copper and gallium compound oxide-on-metallosilicate catalyst according to the present invention is far superior in high-temperature heat resistance in the co-existence of steam and shows an NOx abatement percentage of at least twice after aging of a given length of time, as compared with the conventional catalysts each using the same metallosilicate carrier, such as copper ion-exchanged catalyst, gallium ion-exchanged catalyst, copper and gallium ions-exchanged catalyst, copper oxide catalyst, gallium oxide catalyst and the like.

In the present specification, co-precipitated copper oxide and gallium oxide ($CuO.Ga_2O_3$) refers to a co-precipitated copper and gallium compound oxide unless otherwise specified, and is distinguished from a simple mixture of copper oxide and gallium oxide ($CuO + Ga_2O_3$), gallium oxide supported on copper oxide ($Ga_2O_3/CuO$), copper oxide supported on gallium oxide ($CuO/Ga_2O_3$), etc. These catalysts in which copper and gallium are supported in a form other than co-precipitated compound oxide, show no sufficient NOx reduction ability and no high heat resistance as exhibited by the catalyst of the present invention.

The co-precipitated copper and gallium compound oxide which is an essential constituent of the present catalyst, is loaded on the surfaces of micropores inside and between the particles of the crystalline metallosilicate carrier by a uniform precipitation method, a sol-gel method or the like. The co-precipitated copper and gallium compound oxide is obtained, for example, by impregnating a metallosilicate carrier with a homogeneous mixed solution containing copper and gallium, then adding an alkali such as ammonia water, urea water, sodium carbonate or the like to co-precipitate copper and gallium in the form of uniformly mixed hydroxides or adding oxalic acid to co-precipitate copper and gallium in the form of mixed oxalates, and calcining the mixed hydroxides or oxalates in air to give rise to decomposition.

As the copper compound used for preparing the homogeneous mixed solution of copper and gallium, there can be used copper (I) nitrate, copper (II) chloride, copper (II) sulfate, copper (II) acetate, copper (II) bis-(acetylacetonate), etc. As the gallium compound used for preparing the homogeneous mixed solution of copper and gallium, there can be used gallium (III) chloride, gallium (III) nitrate, gallium (III) sulfate, gallium (III) isopropoxide, etc.

The calcination after co-precipitation of copper and gallium compounds on carrier is conducted at a temperature of 300°–900° C., preferably 450°–700° C. for a time period of, for example, 30 minutes to several hours.

When the calcination temperature is too low (lower than 300° C.), the decomposition of precursor is insufficient and the resulting catalyst has low activity. When the calcination temperature is too high (higher than 900° C.), the crystalline metallosilicate carrier gives rise to partial disintegration and the copper and gallium compound oxide gives rise to agglomeration or crystal growth or separates into respective oxides; hence, the resulting catalyst has low activity.

The co-precipitated copper and gallium compound oxide supported on the metallosilicate, of the present catalyst has no distinct crystal structure as detected by X-ray diffraction, but must be a compound oxide and must not be a simple mixture of supported copper oxide and supported gallium oxide.

Examination by an analytical electron microscope, which is a combination of a scanning electron microscope (SEM) and an energy-dispersive X-ray analysis (EDX), indicates that in the catalyst of the present invention there is seen the presence of Cu and Ga of approximately constant ratio in each compound oxide particle supported on the particle surface of the metallosilicate carrier or on the inner walls of micropores of the carrier.

The electronic state of copper in the copper and gallium compound oxide-on-metallosilicate catalyst of the present invention is characterized in that the Auger parameter $\alpha(eV)$ which is the sum of the binding energy of Cu 2P (3/2) peak and the kinetic energy of Cu LMN peak, as measured by X-ray photoelectron spectroscopy (XPS) of powder catalyst, is shifted by 2.6 eV to a higher energy side as compared with that of a corresponding copper ion-exchanged metallosilicate catalyst and by 1.0 eV to a lower side as compared with that of a corresponding copper oxide-on-metallosilicate catalyst.

In contrast, for example, a catalyst which is a simple mixture of a given weight ratio of metallosilicate-supported copper oxide and metallosilicate-supported gallium oxide, shows no excellent performance as exhibited by the catalyst of the present invention.

In the catalyst of the present invention, the two essential constituents, i.e. the metallosilicate and the co-precipitated copper and gallium compound oxide must be present in a highly dispersed state and in an intimate contact with each other.

Therefore, a catalyst obtained, for example, by simply kneading a co-precipitated copper and gallium compound oxide and a metallosilicate each prepared separately, has insufficient activity and durability.

Thus, the presence of catalytically active component on carrier in good dispersion is necessary in order to obtain high catalytic activity per unit weight of supported constituent, prevent agglomeration under the use conditions, particularly at high temperatures and expect an extended catalyst life.

The copper which is an essential constituent in the present catalyst, is supported in an amount of 0.05-15% by weight, preferably 0.5-8% by weight on the metallosilicate carrier. When the amount of copper is too small, the resulting catalyst has low NOx abatement activity. When the amount is too large, the catalyst has low heat resistance. The gallium which is another essential constituent is supported in an amount of 0.1-20% by weight, preferably 0.5-10% by weight on the metallosilicate carrier. When the amount of gallium is too small, the resulting catalyst has low heat resistance. When the amount is too large, the catalyst has low NOx abatement activity.

The ratio of copper and gallium is 0.1-10, preferably 0.5-2.0 in terms of Cu/Ga atomic ratio. When the amount of copper relative to gallium is too small, the resulting catalyst has low NOx reduction ability. Conversely, when the amount of copper relative to gallium is too large, the catalyst has low heat resistance.

The catalyst of the present invention may be used as a powder per se, but is preferably used by molding into a desired shape or coating on an appropriate refractory substrate, after mixing with an appropriate binder or without using any binder.

As the binder, there can be used, for example, ordinary inorganic binders such as silica sol, alumina sol, titania sol and the like.

Molding is conducted, for example, by adding silica sol and water to the catalyst powder, kneading them, and extruding the kneaded product. The molded product may have various shapes such as pellets, globes, tablets, rings and the like.

In order to enable the treatment of a large amount of exhaust gas flow with a low pressure loss, it is preferable to use the present catalyst by coating it on an monolytic honeycomb structure as a substrate.

As the refractory substrate, there can be used ceramic monoliths of cordierite, mullite, α-alumina, etc. and metal monoliths of aluminum-containing ferrite type stainless steel, austenite type stainless tell, etc.

The wash coat of catalyst powder on refractory substrate can be conducted, for example, by adding silica sol and water to the catalyst powder, milling the mixture to form a thixotropic slurry, dipping a monolithic substrate in the slurry, then drying and calcining the resulting material.

In the present invention, molding of crystalline metallosilicate carrier or coating of the same on refractory substrate may be conducted before or after catalyst production, i.e. loading of co-precipitated copper and gallium compound oxide on crystalline metallosilicate carrier. The timing of said molding or coating does not matter as long as the co-precipitated copper and gallium compound oxide is supported on the crystalline metallosilicate in a dispersed state and the resulting structure undergoes no change in the subsequent step(s).

The space velocity of exhaust gas when the present catalyst is used for treatment of said gas, has no particular restriction but is preferably 5,000-200,000/hr, more preferably 10,000-150,000/hr. When the space velocity is too low, the catalyst is required in a large amount. When the space velocity is too high, the abatement percent of NOx from exhaust gas is low.

The catalyst of the present invention is applied for the treatment of exhaust gases containing NOx, HCs, CO, etc., emitted from internal combustion engines, etc. The present catalyst is particularly effective for exhaust gases containing $O_2$ in excess of stoichiometric amount relative to the reducing components of HCs, $H_2$, CO, etc. By contacting such an exhaust gas with the catalyst of the present invention, the NOx present in the exhaust gas is reduced and decomposed into $N_2$ and $H_2O$ by the reducing agent(s) such as HCs, also present in the exhaust gas in small amount(s), and simultaneously the reducing agent(s) such as HCs is (are) oxidized into $CO_2$ and $H_2O$ and removed.

Exhaust gases emitted from lean-burn gasoline engines, generally contain 2-8% of $O_2$, several hundreds to several thousands of ppm of NOx and several hundreds to several thousands of ppm of HCs (the concentration of HCs is expressed as a $CH_4$-based concentration, and the same applies hereinafter). When such an exhaust gas is contacted with the catalyst of the present invention, a high NOx reduction percent is obtained over a wide temperature (exhaust gas temperature at catalyst layer inlet) range from 300° C. to higher than 700° C.

In exhaust gases emitted from diesel engines, $O_2$ of as high as 5-15% is generally present. Therefore, it is considerably difficult to react one hundred to several hundreds of ppm of NOx with about several tens to about 100 ppm of the remaining HCs. However, by using the catalyst of the present invention, NOx can be reduced by 30% or more. When there is adopted such a system in which about several hundreds to about 1000 ppm of a fresh fuel is added to an exhaust gas and the resulting mixture is contacted with the present catalyst, NOx can be reduced by 50% or more even for exhaust gases from diesel engines.

Since exhaust gases emitted from lean-burn gasoline engines or diesel engines contain about 5-20% of water generally, conventional zeolite type catalysts have undergone severe activity deterioration at 700° C. or more. In contrast, the present catalyst shows significantly improved heat resistance for water-containing exhaust gases emitted from lean-burn engines, of up to about 800° C.

As described above, the catalyst of the present invention is effective for abatement of $NO_x$ present in exhaust gases containing NOx, HCs, CO, etc., particularly exhaust gases emitted from lean-burn engines containing an excessive amount of $O_2$, such as lean-burn gasoline engines and diesel engines, and has high NOx abatement activity and excellent durability. Hence, the exhaust gas purification system using the present catalyst shows a high effect.

The present invention is hereinafter described in more detail by way of Reference Examples, Examples and Performance Evaluation Examples. However, the present invention is by no means restricted to the following Examples.

Reference Example 1

Production of aluminosilicate carriers

Five aluminosilicates of different structures and compositions were produced according to the following method. To a solution (I) consisting of 97% $H_2SO_4$ of weight (a), a template agent (b) [TPAB (tetrapropylammonium bromide) or TBAB (tetrabutylammonium bromide)] of a weight (c) and deionized water of a weight (d) were dropwise added, with vigorous stirring, a solution (II) consisting of NaOH of a weight (e), $NaAlO_2$ of a weight (f) and deionized water of a weight (g) and a solution (III) consisting of 30% colloidal silica of a weight (h), simultaneously at given rates. The resulting mixture was stirred for 15 minutes, then fed into a stainless steel autoclave, and kept at 170° C. for 100 hours under a autogenous pressure with stirring. The resulting product was subjected to filtration and washing, calcined in air at 550° C. for 5 hours then treated with 0.2N aqueous ammonium nitrate solution, and calcined in air at 550° C. for 5 hours to obtain hydrogen type aluminosilicates AS-1 to AS-5. The crystal structures of these products were identified by powder method for X-ray diffraction. The structures and compositions of the products are shown in Table 1.

and GAS-2. The structures and compositions of these products are shown in Table 2.

Reference Example 3

Production of other metalloaluminosilicate carriers

Various hydrogen type metalloaluminosilicates FAS-1, YAS-1, LAS-1 and CAS-1 were produced in the same manner as in Reference Example 2 except that the gallium nitrate [$Ga(NO_3)_3 \cdot 8H_2O$] was changed to iron (III) nitrate [$Fe(NO_3)_3 \cdot 9H_2O$], yttrium (III) nitrate [$Y(NO_3)_3 \cdot 6H_2O$], lanthanum (III) nitrate [$La(NO_3)_3 \cdot 6H_2O$] and cerium (III) nitrate [$Ce(NO_3)_3 \cdot 6H_2O$] each of a weight (c). The production conditions, structures and compositions of these metalloaluminosilicates are shown in Table 2.

TABLE 1

| | Solution (I) | | | Solution (II) | | | Solution (III) | Hydrogen type aluminosilicate product | | | | |
|---|---|---|---|---|---|---|---|---|---|---|---|---|
| | 97% $H_2SO_4$ | Template | | $H_2O$ | NaOH | $NaAlO_2$ | $H_2O$ | 30% $SiO_2$ sol | Crystal | Composition | | | |
| Carrier | (a)gr | (b) | (c)gr | (d)gr | (e)gr | (f)gr | (g)gr | (h)gr | structure | $SiO_2/Al_2O_3$ | x | y | z |
| AS-1 | 99.2 | TPAB | 128 | 1600 | 94.4 | 26.1 | 800 | 960 | MFI | 60 | 0 | 0.032 | 0.968 |
| AS-2 | 107.9 | TPAB | 128 | 1600 | 94.4 | 40.3 | 800 | 917 | MFI | 30 | 0 | 0.0625 | 0.9375 |
| AS-3 | 70.8 | TPAB | 128 | 1600 | 94.4 | 15.7 | 800 | 1000 | MFI | 100 | 0 | 0.020 | 0.980 |
| AS-4 | 99.2 | TBAB | 256 | 1600 | 94.4 | 26.1 | 800 | 960 | MEL | 60 | 0 | 0.032 | 0.968 |
| AS-5 | — | TPAB | 128 | 800 | 54.1 | — | 800 | 1700 | MFI | 600 | 0 | 0.0033 | 0.9967 |

AS = Aluminosilicate

Reference Example 2

Production of galloaluminosilicate carriers

To a solution (I) consisting of 97% $H_2SO_4$ of a weight (a), a metal salt (b) [gallium nitrate $Ga(NO_3)_3 \cdot 8H_2O$] of a weight (c), a template agent (d) [TPAB (tetrapropylammonium bromide)] of a weight (e) and deionized water of a weight (f) were dropwise added, with vigorous stirring, a solution (II) consisting of NaOH of a weight (g), $NaAlO_2$ of a weight (h) and deionized water of a weight (i) and a solution (III) consisting of 30% colloidal silica of a weight (j), simultaneously at given rates. Stirring was conducted and the mixture was subjected to a hydrothermal reaction and an ion exchange treatment in the same manners as in Reference Example 1 to obtain hydrogen type galloaluminosilicates GAS-1

TABLE 2

| Production of metalloaluminosilicate carriers | | | | | | | | | | |
|---|---|---|---|---|---|---|---|---|---|---|
| | Solution (I) | | | | | | Solution (II) | | | Solution (III) |
| | 97% $H_2SO_4$ | Metal salt | | Template | | $H_2O$ | NaOH | $NaAlO_2$ | $H_2O$ | 30% $SiO_2$ sol |
| Carrier | (a)gr | (b) | (c)gr | (d) | (e)gr | (f)gr | (g)gr | (h)gr | (i)gr | (j)gr |
| GAS-1 | 96.0 | $Ga(NO_3)_3 \cdot 8H_2O$ | 31.3 | TPAB | 128 | 1600 | 94.4 | 11.5 | 800 | 950 |
| GAS-2 | — | $Ga(NO_3)_3 \cdot 8H_2O$ | 61.9 | TPAB | 190 | 1000 | 26.5 | — | 760 | 1000 |
| FAS-1 | 94.0 | $Fe(NO_3)_3 \cdot 9H_2O$ | 32.3 | TPAB | 128 | 1600 | 95.5 | 11.8 | 800 | 960 |
| YAS-1 | 97.1 | $Y(NO_3)_3 \cdot 6H_2O$ | 35.6 | TPAB | 149 | 1600 | 103.5 | 13.7 | 800 | 930 |
| LAS-1 | 97.1 | $La(NO_3)_3 \cdot 6H_2O$ | 35.6 | TPAB | 149 | 1600 | 103.5 | 13.7 | 800 | 930 |
| CAS-1 | 95.5 | $Ce(NO_3)_3 \cdot 6H_2O$ | 33.6 | TPAB | 128 | 1600 | 95.5 | 11.4 | 800 | 960 |

| | Hydrogen type metalloaluminosilicae product | | | | | |
|---|---|---|---|---|---|---|
| | | Composition | | | | | |
| | Crystal | $SiO_2$ | $SiO_2$ | $SiO_2$ | | | |
| Carrier | structure | $M_2O_3$ | $Al_2O_3$ | $M_2O_3 + Al_2O_3$ | x | y | z |
| GAS-1 | MFI | 120 | 120 | 60 | 0.016 | 0.016 | 0.968 |
| GAS-2 | MFI | 60 | 1000 | 57 | 0.0019 | 0.032 | 0.966 |
| FAS-1 | MFI | 120 | 120 | 60 | 0.016 | 0.016 | 0.968 |
| YAS-1 | MFI | 120 | 120 | 60 | 0.016 | 0.016 | 0.968 |
| LAS-1 | MFI | 120 | 120 | 60 | 0.016 | 0.016 | 0.968 |
| CAS-1 | MFI | 120 | 120 | 60 | 0.016 | 0.016 | 0.968 |

GAS = Galloaluminosilicate
FAS = Ferroaluminosilicate
YAS = Yttroaluminosilicate
LAS = Lanthanoaluminosilicate
CAS = Ceroaluminosilicate

EXAMPLE 1

Production (1) of co-precipitated copper and gallium compound oxide-on-aluminosilicate catalysts (a) Supporting of co-precipitated copper and gallium compound oxide on aluminosilicate carrier 50 g of a crystalline aluminosilicate (AS-1) powder was added to 1,400 ml of deionized water to prepare a slurry. Thereto was dropwise added, with stirring, 300 ml of an aqueous solution containing copper (II) nitrate [$Cu(NO_3)_2 \cdot 3H_2O$] containing 2.67 g of Cu and gallium (III) nitrate [$Ga(NO_3)_3 \cdot 8H_2O$] containing 2.93 g of Ga. To the resulting slurry being vigorously stirred was dropwise added 2% ammonia slowly to adjust the slurry to pH 7.0 in 40 minutes. The resulting product was subjected to filtration and washing and then dried at 100° C. for 16 hours to obtain a cake. The cake was ground and calcined in air at 550° C. for 4 hours to obtain 57.3 g of a 12.7% co-precipitated copper and gallium compound oxide (Cu/Ga atomic ratio=1)-on-aluminosilicate catalyst powder (CuO.Ga$_2$O$_3$/AS-1).

(b) Wash coat on honeycomb

To 30 g of the above catalyst powder were added 2.0 g of 3% silica sol and 50 ml of deionized water. The mixture was milled in a ball mill for 16 hours to obtain a slurry. In this slurry was dipped a core piece of 2.54 cm in diameter and 6.35 cm in length, obtained by gouging from a commmercially available cordierite honeycomb of 400 cells. The excessive slurry was removed by air blowing. The resulting honeycomb was dried and then calcined at 500° C. for 30 minutes to obtain a catalyst honeycomb (1) in which 100 g (dry basis) of a catalyst was coated on each one liter of a honeycomb.

By subjecting the aluminosilicate carriers AS-2, AS-3 and AS-4 to the same procedures as in the above (a) and (b), there were obtained catalyst honeycombs (2), (3) and (4) of 12.7% co-precipitated copper and gallium compound oxide-on-aluminosilicate catalysts (CuO.Ga$_2$O$_3$/AS-2, CuO.Ga$_2$O$_3$/AS-3, CuO.Ga$_2$O$_3$/AS-4).

EXAMPLE 2

Production of co-precipitated copper and gallium compound oxide-on-metalloaluminosilicate catalysts Catalyst honeycombs (5) to (10) of co-precipitated copper and gallium compound oxide-on-metalloaluminosilicate catalysts (CuO.Ga$_2$O$_3$/ GAS-1 to GAS-2, and CuO.Ga$_2$O$_3$/FAS-1, YAS-1, LAS-1 and CAS-1) were obtained in the same manner as in Example 1 except that the aluminosilicate carrier was changed to galloaluminosilicate (GAS-1, or GAS-2), ferroaluminosilicate (FAS-1), yttroaluminosilicate (YAS-1), lanthanoaluminosilicate (LAS-1) or ceroaluminosilicate (CAS-1). The amount of each catalyst coated on honeycomb was adjusted to be 100 g/liter.

EXAMPLE 3

Production (2) of co-precipitated copper and gallium compound oxide-on-aluminosilicate catalysts A catalyst honeycomb (11) of a 9.1% coprecipitated copper and gallium compound oxide (Cu/Ga atomic ratio=1.8)-on-aluminosilicate catalyst (CuO.Ga$_2$O$_3$/AS-1) and a catalyst honeycomb (12) of a 11.00% co-precipitated copper and gallium compound oxide (Cu/Ga atomic ratio=0.6)-on-aluminosilicate catalyst (CuO.Ga$_2$O$_3$/AS-1) were obtained in the same manner as in Example 1 except that the Cu and Ga contents in the aqueous solution were changed to 2.42 g (Cu) and 1.47 g (Ga) and 1.67 g (Cu) and 3.05 g (Ga), respectively.

Comparative Example 1

Production of copper ion-exchanged aluminosilicate catalysts 50 g of an aliminosilicate (AS-1) powder was added to 2,000 ml of a 0.03M aqueous copper acetate solution to prepare a slurry. The slurry was stirred at room temperature for 16 hours and subjected to filtration, washing and drying to obtain a copper ion-exchanged aluminosilicate catalyst (Cu/AS-1) having an ion exchange ratio of 100% with respect to Cu$^{2+}$ ion (the same applies hereinafter). The catalyst was subjected to the same treatment as in Example 1 to obtain a catalyst honeycomb (13).

Similarly, there were obtained catalyst honeycombs (14) to (16) wherein copper was supported on a galloaluminosilicate (GAS-2), a ferroaluminosilicate (FAS-1) and a ceroaluminosilcate (CAS-1) by ion exchange.

Comparative Example 2

Production of gallium ion-exchanged aluminosilicate catalyst

A catalyst honeycomb (17) of a gallium ion-exchanged aluminosilicate catalyst (Ga/AS-1) having an ion exchange ratio of 95% with respect to Ga$^{3+}$ ion (the same applies hereinafter) was obtained in the same manner as in Comparative Example 1 except that the aqueous copper acetate solution was changed to an aqueous gallium nitrate solution.

Comparative Example 3

Production of copper and gallum ions-exchanged aluminosilicate catalyst

A catalyst honeycomb (18) of a copper and gallium ions-exchanged aluminosilicate catalyst (Cu.Ga/AS-1) having a copper ion exchange ratio of 50% and a gallium ion exchange ratio of 50% was obtained in the same manner as in Comparative Example 1 except that the 0.03M aqueous copper acetate solution was changed to an aqueous solution containing 0.018M of copper acetate and 0.012M of gallium nitrate.

Comparative Example 4

Production of copper oxide-on-aluminosilicate catalyst

A catalyst honeycomb (19) of a 5.4% copper oxide-on-aluminosilicate catalyst (CuO/AS-3) was obtained in the same manner as in Example 1 except that an aqueous solution containing only copper nitrate (Cu: 2.27 g) was dropwise added to a slurry of 50 g of an aluminosilicate (AS-3) powder.

Comparative Example 5

Production of gallium oxide-on-aluminosilicate catalyst

A catalyst honeycomb (20) of a 6.3% gallium oxide-on-aluminosilicate catalyst (Ga$_2$O$_3$/AS-1) was obtained in the same manner as in Example 1 except that an aqueous solution containing only gallium nitrate (Ga: 2.51 g) was dropwise added to a slurry of 50 g of an aluminosilicate (AS-1) powder.

Comparative Example 6

Production of copper oxide and gallium oxide-on-aluminosilicate catalyst

A catalyst honeycomb (21) of a 5.4% copper oxide and 6.0% gallium oxide-on-aluminosilicate catalyst (CuO/Ga$_2$O$_3$/AS-1) was obtained by making 50 g of the 6.3% gallium oxide-on-aluminosilicate (Ga$_2$O$_3$/AS-1) powder obtained in Comparative Example 5, into a slurry and treating the slurry in the same manner as in Comparative Example 4 to allow the slurry to support copper oxide.

Comparative Example 7

Production of gallium oxide and copper oxide-on-aluminosilicate catalyst

A catalyst honeycomb (22) of a 6.3% gallium oxide and 5.1% copper oxide-on-aluminosilicate catalyst (Ga$_2$O$_3$/CuO/AS-3) was obtained by treating the 5.4% copper oxide-on-aluminosilicate (CuO/AS-3) powder obtained in Comparative Example 4 in the same manner as in Comparative Example 5 to allow the powder to support gallium oxide.

Comparative Example 8

Production of co-precipitated copper and gallium compound oxide catalyst

2% ammonia water was dropwise added slowly to 10 liters of an aqueous solution containing copper nitrate (Cu=18.2 g) and gallium nitrate (Ga=20.1 g), with vigorous stirring, whereby the pH of the solution was adjusted to 7.0 in about 1 hour. The resulting product was subjected to filtration, washing and drying to obtain a cake. The cake was ground and then calcined in air at 550° C. for 4 hours to obtain a co-precipitated copper and gallium compound oxide gel ($CuO.Ga_2O_3$, Cu/Ga atomic ratio=1) having a BET specific surface area of 100 m². The gel was wash-coated on a honeycomb in the same manner as in Example 1 to obtain a catalyst honey-comb (23).

Comparative Example 9

Production of mixed catalyst of (co-precipitated copper oxide gallium compound oxide+aluminosilicate)

2.0 g of 30% silica sol and 50 ml of deionized water were added to 3.6 g of the co-precipitated copper and gallium compound oxide gel ($CuO.Ga_2O_3$) powder obtained in Comparative Example 8 and 25.0 g of an aluminosilicate (AS-1) powder. The mixture was milled in a ball mill for 16 hours to obtain a slurry. The slurry was wash-coated on a honeycomb to obtain a catalyst honeycomb (24) of a mixed catalyst of (12.6% co-precipitated copper and gallium compound oxide+87.4% aluminosilicate) ($CuO.Ga_2O_3$+AS-1).

Comparative Example 10

Production of co-precipitated copper and gallium compound oxide-on-alumina catalyst A catalyst honeycomb (25) of a co-precipitated copper and gallium compound oxide-on-alumina catalyst ($CuO.Ga_2O_3/Al_2O_3$) was obtained in the same manner as in Example 1 except that the aluminosilicate (AS-1) carrier was changed to γ-alumina (KHA-24 manufactured by SUMITOMO CHEMICAL CO., LTD.)

Comparative Example 11

Production of co-precipitated copper and gallium compound oxide-on-aluminosilicate catalysts A catalyst honeycomb (26) of a co-precipitated copper and gallium compound oxide-on-silicalite catalyst ($CuO.Ga_2O_3$/AS-5) was obtained in the same manner as in Example 1 except that the aluminosilicate (AS-1) carrier was changed to the aluminosilicate (AS-5) produced in Reference Example 1.

Similarly, a catalyst honeycomb (27) of a co-precipitated copper and gallium compound oxide-on-Y zeolite catalyst ($CuO.Ga_2O_3$/AS-6) was obtained in the same manner as in Example 1 except that the aluminosilicate (AS-1) carrier was changed to a H-Y zeolite (TSZ-320 manufactured by Tosoh Corporation) (AS-6) represented by a structural formula $$[(x+y)/n]R (M_xAl_ySi_z)O_2$$

wherein R=H+, X=0, y=0.267 and z=0.733.

Comparative Example 12

Preparation of Pt and Rh-on-alumina catalyst (TWC)

120 g of active alumina having a BET specific surface area of 150 m²/g and an average particle diameter of 30μ was placed in a mixer and stirred. Thereto was added in small portions 30 ml of an aqueous amine solution containing platinum hydroxide (Pt=2.0 g) to allow the platinum hydroxide to be supported on the active alumina in a uniformly dispersed state. Then, 15 ml of an aqueous rhodium nitrate solution (Rh=0.41 g) was added in small portions to allow the rhodium nitrate to be supported on the active alumina in a uniformly dispersed state. Thereafter, 10 ml of 25% acetic acid was added in small portions to prepare a 1.7% Pt and 0.34% Rh-on-alumina powder (Pt/Rh weight ratio=5/1). The powder was treated in the same manner as in Example 1 (b) to obtain a catalyst honeycomb (28) of Pt and Rh-on-γ-$Al_2O_3$ catalyst.

Performance Evaluation Example 1

Evaluation (1) of abatement activity and durability using model exhaust gas of lean-burn gasoline engine A mixed gas consisting of 500 ppm of NO, 1,500 ppm of propylene $C_3H_6$, 5% of $O_2$ and the remainder of $N_2$ (this gas corresponded to A/F=19 and was used as a model exhaust gas of lean-burn gasoline engine) was fed on each of the 400-cell honeycomb pieces of 2.54 cm in diameter and 6.35 cm in length coated with the catalysts (1) to (12) produced in Examples 1-3 and the catalysts (13) to (28) produced in Comparative Examples 1-12, at a space velocity of 40,000/hr with the gas temperature at the catalyst layer inlet being increased from 200° C. to 500° C. at a rate of 30° C./min, whereby the NO abatement activity of each catalyst was examined (mode A). Then, each catalyst on honeycomb piece was subjected to an aging treatment at 700° C. for 5 hours in a stream of a mixed gas consisting of 10% $H_2O$ and 90% air, after which the resulting catalyst was evaluated again for performance in the above mode A. Table 3 shows the NO abatement activity of each catalyst before and after aging, at the catalyst layer inlet gas temperature of 450° C.

TABLE 3

| | | NO abatement activity of each catalyst in fresh state and after aging (mode A) | | | |
|---|---|---|---|---|---|
| | | | NO Reduction ability | | |
| | Catalyst No. | Catalyst type | Fresh $C_{450}$ (%) | After aging $C_{450}$ (%) | Retention (%) |
| Example 1 | (1) | $CuO.Ga_2O_3$/AS-1 | 74 | 61 | 82 |
| | (2) | $CuO.Ga_2O_3$/AS-2 | 80 | 66 | 83 |
| | (3) | $CuO.Ga_2O_3$/AS-3 | 65 | 56 | 86 |
| | (4) | $CuO.Ga_2O_3$/AS-4 | 68 | 57 | 84 |
| Example 2 | (5) | $CuO.Ga_2O_3$/GAS-1 | 78 | 63 | 81 |
| | (6) | $CuO.Ga_2O_3$/GAS-2 | 70 | 56 | 80 |
| | (7) | $CuO.Ga_2O_3$/FAS-1 | 71 | 59 | 83 |
| | (8) | $CuO.Ga_2O_3$/YAS-1 | 68 | 55 | 81 |
| | (9) | $CuO.Ga_2O_3$/LAS-1 | 72 | 58 | 81 |
| | (10) | $CuO.Ga_2O_3$/CAS-1 | 64 | 53 | 83 |
| Example 3 | (11) | $CuO.Ga_2O_3$/AS-1 | 75 | 60 | 80 |
| | (12) | $CuO.Ga_2O_3$/AS-1 | 65 | 56 | 86 |
| Comparative Example 1 | (13) | Cu/AS-1 | 62 | 32 | 52 |
| | (14) | Cu/GAS-2 | 54 | 25 | 46 |
| | (15) | Cu/FAS-1 | 64 | 35 | 55 |
| | (16) | Cu/CAS-1 | 55 | 40 | 73 |
| Comparative Example 2 | (17) | Ga/AS-1 | 3 | 2 | 67 |
| Comparative Example 3 | (18) | Cu.Ga/AS-1 | 32 | 17 | 53 |
| Comparative Example 4 | (19) | $CuO$/AS-3 | 44 | 26 | 59 |
| Comparative | (20) | $Ga_2O_3$/AS-1 | 4 | 2 | 50 |

TABLE 3-continued

NO abatement activity of each catalyst in fresh state and after aging (mode A)

| Cat-a-lyst No. | Catalyst type | Fresh C450 (%) | After aging C450 (%) | Retention (%) |
|---|---|---|---|---|
| Example 5 |  |  |  |  |
| Comparative Example 6 | (21) CuO/Ga2O3/AS-1 | 60 | 35 | 58 |
| Comparative Example 7 | (22) Ga2O3/CuO/AS-3 | 43 | 24 | 56 |
| Comparative Example 8 | (23) CuO.Ga2O3 | 6 | 5 | 83 |
| Comparative Example 9 | (24) CuO.Ga2O3 + AS-1 | 34 | 23 | 68 |
| Comparative Example 10 | (25) CuO.Ga2O3/Al2O3 | 24 | 18 | 75 |
| Comparative Example 11 | (26) CuO.Ga2O3/AS-5 | 12 | 9 | 75 |
|  | (27) CuO.Ga2O3/AS-6 | 17 | 7 | 41 |
| Comparative Example 12 | (28) Pt-Rh/Al2O3(TWC) | 0 | 0 | — |

Comparisons of the catalyst (1) of Example with the catalysts (13), (17), (18) and (20) of Comparative Examples, the catalyst (6) with the catalyst (14), the catalyst (7) with the catalyst (15), and the catalyst (10) with the catalyst (16) indicate that co-precipitated copper and gallium compound oxide-on-carrier catalysts are superior in NO abatement activity and durability to all of ion-exchanged copper or gallium catalysts, single-metal oxide catalyst and ion-exchanged copper and gallium catalyst, each using a corresponding metallosilicate carrier.

Comparisons of the catalyst (1) with the catalysts (21) and (24), and the catalyst (3) with the catalyst (22) indicate that even when copper and gallium are present together with a metallosilicate, the system shows no effect if copper and gallium are not supported on the metallosilicate in a dispersed state in the form of a co-precipitated compound oxide.

Comparison of the catalyst (1) with the catalysts (23), (24), (25), (26) and (27) indicates that when a co-precipitated copper and gallium compound oxide is not supported on a crystalline metallosilicate of the present invention, that is, when the compound oxide is not supported on any carrier, as in the case of the catalyst (23), or when the compound oxide is simply physically mixed with the metallosilicate as in the case of the catalyst (24), or when the compound oxide is supported on a general-purpose carrier such as alumina as in the case of the catalyst (25), such a system has an insufficient activity. Further, even when the compound oxide is supported on the metallosilicate, if z of the following formula $$[(x+y)/n]R \; (M_xAl_ySi_z)O_2$$

is not in the range of $0.882 \leq z \leq 0.990$, the system has low activity as in the case of the catalyst (26) or low durability as in the case of the catalyst (27).

The conventional three-way catalyst (28) shows substantially no NO abatement activity at 450° C. under the present evaluation conditions (mode A).

Performance Evaluation Example 2

Evaluation of abatement activity and durability using model exhaust gas of diesel engine A mixed gas consisting of 500 ppm of NO, 1,500 ppm of propylene $C_3H_6$, 15% of $O_2$ and the remainder of $N_2$ (this gas corresponded to A/F=48 and was used as a model exhaust gas of diesel engine) was fed on each of the 400-cell honeycomb pieces of 2.54 cm in diameter and 6.35 cm in length coated with the catalysts (1) to (12) of Examples 1-3 and the catalysts (13) to (28) of Comparative Examples 1-12, at a space velocity of 40,000/hr in the same manner as in Performance Evaluation Example 1, whereby the NO abatement activity of each catalyst was examined (mode B). Then, each catalyst on honeycomb piece was subjected to an aging treatment under the same conditions as in Performance Evaluation Example 1, after which the resulting catalyst was evaluated again for performance in the above mode B. Table 4 shows the NO abatement activities of each catalyst before and after aging, at the catalyst layer inlet gas temperature of 450° C.

TABLE 4

NO abatement activity of each catalyst in fresh state and after aging (mode B)

| Cat-a-lyst No. | Catalyst type | Fresh C450 (%) | After aging C450 (%) | Retention (%) |
|---|---|---|---|---|
| Example 1 | (1) CuO.Ga2O3/AS-1 | 59 | 53 | 90 |
| | (2) CuO.Ga2O3/AS-2 | 55 | 51 | 93 |
| | (3) CuO.Ga2O3/AS-3 | 52 | 50 | 96 |
| | (4) CuO.Ga2O3/AS-4 | 50 | 47 | 94 |
| Example 2 | (5) CuO.Ga2O3/GAS-1 | 60 | 53 | 88 |
| | (6) CuO.Ga2O3/GAS-2 | 53 | 45 | 85 |
| | (7) CuO.Ga2O3/FAS-1 | 54 | 49 | 87 |
| | (8) CuO.Ga2O3/YAS-1 | 51 | 43 | 85 |
| | (9) CuO.Ga2O3/LAS-1 | 55 | 47 | 86 |
| | (10) CuO.Ga2O3/CAS-1 | 54 | 48 | 89 |
| Example 3 | (11) CuO.Ga2O3/AS-1 | 57 | 47 | 82 |
| | (12) CuO.Ga2O3/AS-1 | 50 | 46 | 91 |
| Comparative Example 1 | (13) Cu/AS-1 | 42 | 22 | 52 |
| | (14) Cu/GAS-2 | 40 | 25 | 63 |
| | (15) Cu/FAS-1 | 48 | 30 | 63 |
| | (16) Cu/CAS-1 | 46 | 28 | 61 |
| Comparative Example 2 | (17) Ga/AS-1 | 2 | 1 | 50 |
| Comparative Example 3 | (18) Cu.Ga/AS-1 | 26 | 14 | 54 |
| Comparative Example 4 | (19) CuO/AS-3 | 33 | 21 | 64 |
| Comparative Example 5 | (20) Ga2O3/AS-1 | 3 | 2 | 67 |
| Comparative Example 6 | (21) CuO/Ga2O3/AS-1 | 42 | 29 | 69 |
| Comparative Example 7 | (22) Ga2O3/CuO/AS-3 | 32 | 21 | 65 |
| Comparative Example 8 | (23) CuO.Ga2O3 | 4 | 3 | 75 |
| Comparative Example 9 | (24) CuO.Ga2O3 + AS-1 | 24 | 17 | 71 |
| Comparative Example 10 | (25) CuO.Ga2O3/Al2O3 | 10 | 8 | 80 |
| Comparative Example 11 | (26) CuO.Ga2O3/AS-5 | 8 | 6 | 75 |
| | (27) CuO.Ga2O3/AS-6 | 11 | 5 | 45 |
| Comparative Example 12 | (28) Pt-Rh/Al2O3(TWC) | 0 | 0 | — |

As is clear from Table 4, the catalysts of the present invention show excellent NO abatement activity and durability even under the condition of high $O_2$ concentration, as compared with conventional catalysts.

Performance Evaluation Example 3

Evaluation (2) of abatement activity and durability using model exhaust gas of lean-burn gasoline engine A mixed gas consisting of 1,000 ppm of NO, 3,000 ppm of CO, 1,300 ppm of C$_3$H$_6$, 1,000 ppm pf H$_2$, 3 5% of O$_2$, 10% of CO$_2$, 10% of H$_2$O and the remainder of N$_2$ (this gas was used as a model exhaust gas of leanburn gasoline engine) was fed on each of the 400-cell honeycomb pieces of the same size as in Performance Evaluation Example 1, coated with the catalyst (1) of Example 1 and the catalyst (13) of Comparative Example 1, at a space velocity of 100,000/hr with the gas temperature at the catalyst layer inlet being increased at a rate of 30° C./min, whereby the abatement activities of each catalyst for CO, HC and NO were examined (mode C).

After the performance evaluation of each catalyst on honeycomb piece was subjected to an aging treatment under the same conditions as in Performance Evaluation Example 1, after which the resulting catalyst was again evaluated for performance in the mode C.

FIG. 1 shows the NO light-off profiles before and after aging, of the catalyst (1) of Example 1.

Figure 2:
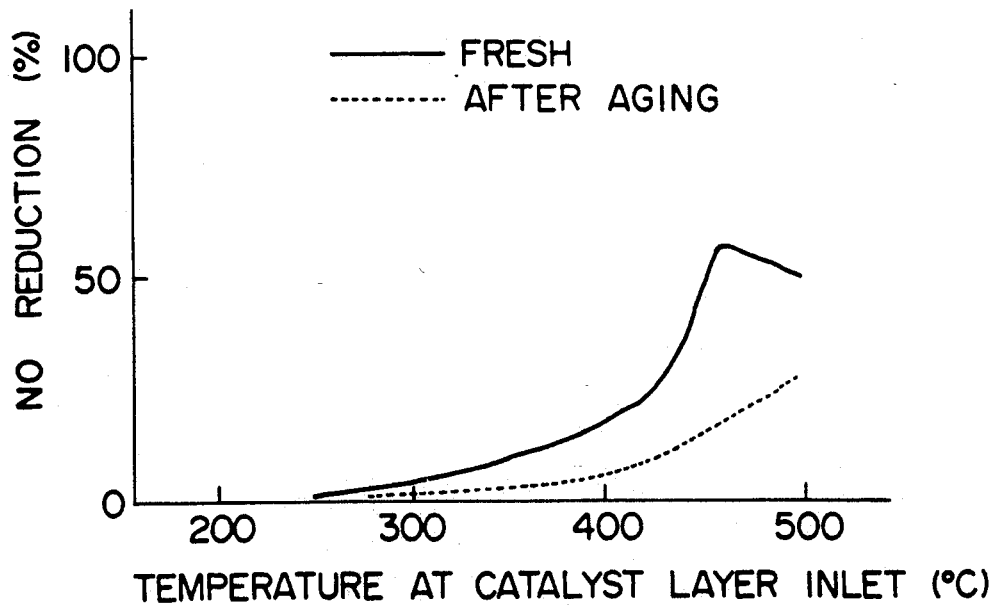
FIG. 2 shows the NO abatement activities measured in mode c, of the catalyst (13) (produced in Comparative Example 1) in a fresh state and after aging.

FIG. 2 shows the NO light-off profiles before and after aging, of the catalyst (13) of Comparative Example 1.

In the catalyst (1) of Example 1, there is substantially no shift of rise in NO light-off curve, to higher temperature, after aging, and 85% of the original NO abatement activity is retained after aging. Thus, the catalyst (1) of Example 1 is significantly improved in heat resistance, as compared with the catalyst (13) of Comparative Example 1.

What is claimed is

1. A catalyst for purification of exhaust gases containing nitrogen oxides in the co-existence of oxygen in excess of stoichiometric amount, which catalyst comprises (a) a carrier consisting of a crystalline metallosilicate whose anhydrous state is represented by the following chemical formula $$[(x+y)/n]R\ (M_xAl_ySi_z)O_2$$

wherein R is at least one cation having a valence n; x, y and z are, respectively, mole fractions of different metal elements M, Al and Si present as a tetrahedral oxide in the skeletal structure; M is at least one metal selected from the group consisting of Ga, Fe, Y and rare earth elements: $X+Y+z=1,000$, $x \geqq 0$, $y>0$ and $0.990 \geqq z \geqq 0.882$, and (b) a co-precipitated compound oxide of copper and gallium, supported on said carrier in a dispersed state.

2. The catalyst set forth in claim 1, which is molded into a particular shape or coated on a refractory substrate.

* * * * *